United States Patent
Williams

(10) Patent No.: US 9,167,239 B2
(45) Date of Patent: Oct. 20, 2015

(54) SYSTEM AND MOVING MODULATED TARGET WITH UNMODULATED POSITION REFERENCES FOR CHARACTERIZATION OF IMAGING SENSORS

(71) Applicant: Raytheon Company, Waltham, MA (US)

(72) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 237 days.

(21) Appl. No.: 14/025,727

(22) Filed: Sep. 12, 2013

(65) Prior Publication Data

US 2015/0070511 A1 Mar. 12, 2015

(51) Int. Cl.
*H04N 17/00* (2006.01)

(52) U.S. Cl.
CPC .................... *H04N 17/002* (2013.01)

(58) Field of Classification Search
CPC ..... H04N 17/002; H04N 17/00; H04N 17/02; G01D 18/00; G05B 9/02; G06K 9/325
USPC ............ 348/188, 187, 180; 702/104, 85, 108, 702/116
IPC ...................................................... H04N 17/00
See application file for complete search history.

(56) References Cited

U.S. PATENT DOCUMENTS

| 6,285,799 | B1 | 9/2001 | Dance |
| 7,463,753 | B2 | 12/2008 | Williams et al. |
| 7,881,495 | B2 | 2/2011 | Williams et al. |
| 7,899,271 | B1 | 3/2011 | Williams |
| 7,920,982 | B2 | 4/2011 | Williams et al. |
| 2003/0019931 | A1* | 1/2003 | Tsikos et al. ................. 235/454 |
| 2004/0227937 | A1 | 11/2004 | Richardson |
| 2009/0299674 | A1 | 12/2009 | Williams |
| 2010/0283876 | A1 | 11/2010 | Chan et al. |
| 2013/0050505 | A1 | 2/2013 | Williams |

OTHER PUBLICATIONS

Krist et al., "20 years of Hubble Space Telescope Optical Modeling Using Tiny Tim," European Souther Observatory, Karl Schwarzchild Str. 2 D-85748, Garching, Germany, Sep. 21, 2011.

(Continued)

*Primary Examiner* — Sherrie Hsia
(74) *Attorney, Agent, or Firm* — Eric A. Gifford

(57) ABSTRACT

Embodiments of a system for characterization of an imaging sensor using a moving modulated target with unmodulated position references is generally described herein. A target pattern comprises through-holes in a slide and resolved patches on the slide. The slide and patch have different emission intensities in the sensor' detection band. A modulation is applied to only the emission intensities of the through-holes. The target pattern is moved across the field-of view (FOV) of the imaging sensor to present the target pattern across different frames at different positions. Frames of images of the moving target pattern as seen in the FOV of the imaging sensor are captured to generate modulated image data outputs. The unmodulated position references provided by the resolved patches are measured and used to align the modulated image data outputs, which are processed to generate data products representative of a response of the imaging sensor.

20 Claims, 7 Drawing Sheets

(56) References Cited

OTHER PUBLICATIONS

Gershberg et al., "A Practical Algorithm for the Determination of Phase from Image and Diffraction Plane Pictures," Cavendish Laboratory, Cambridge, England, Received Nov. 29, 1971, pp. 237-246.

Krist et al., "Phase-retrieval analysis of pre- and post-repair Hubble Space Telescope images," Aug. 1, 1995, vol. 34. No. 22, Applied Optics, pp. 4951-4964.

Roddier et al., "Combined approace to the Hubble Space Telescope wave-front distortion analysis," Applied Optics, vol. 32, No. 16, Jun. 1, 1993, pp. 2992-3008.

* cited by examiner

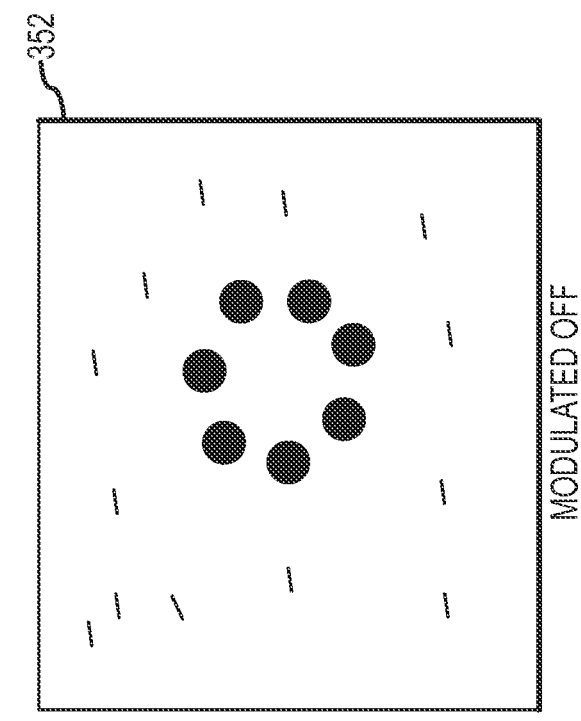
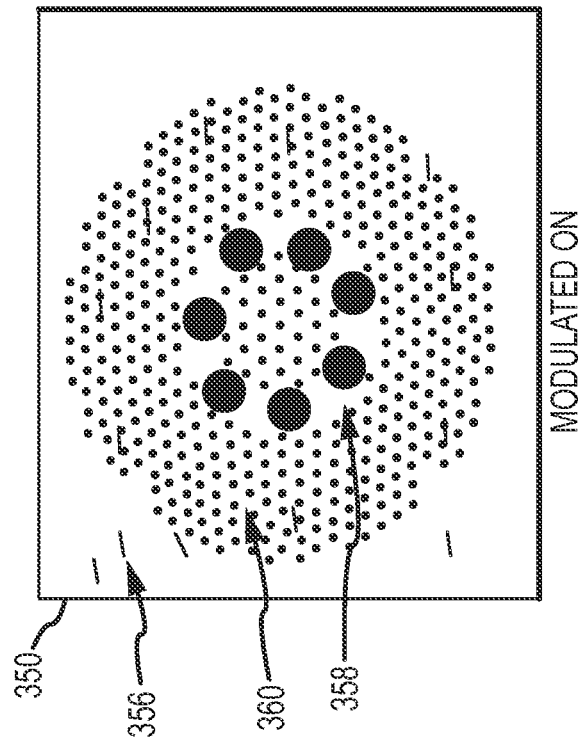

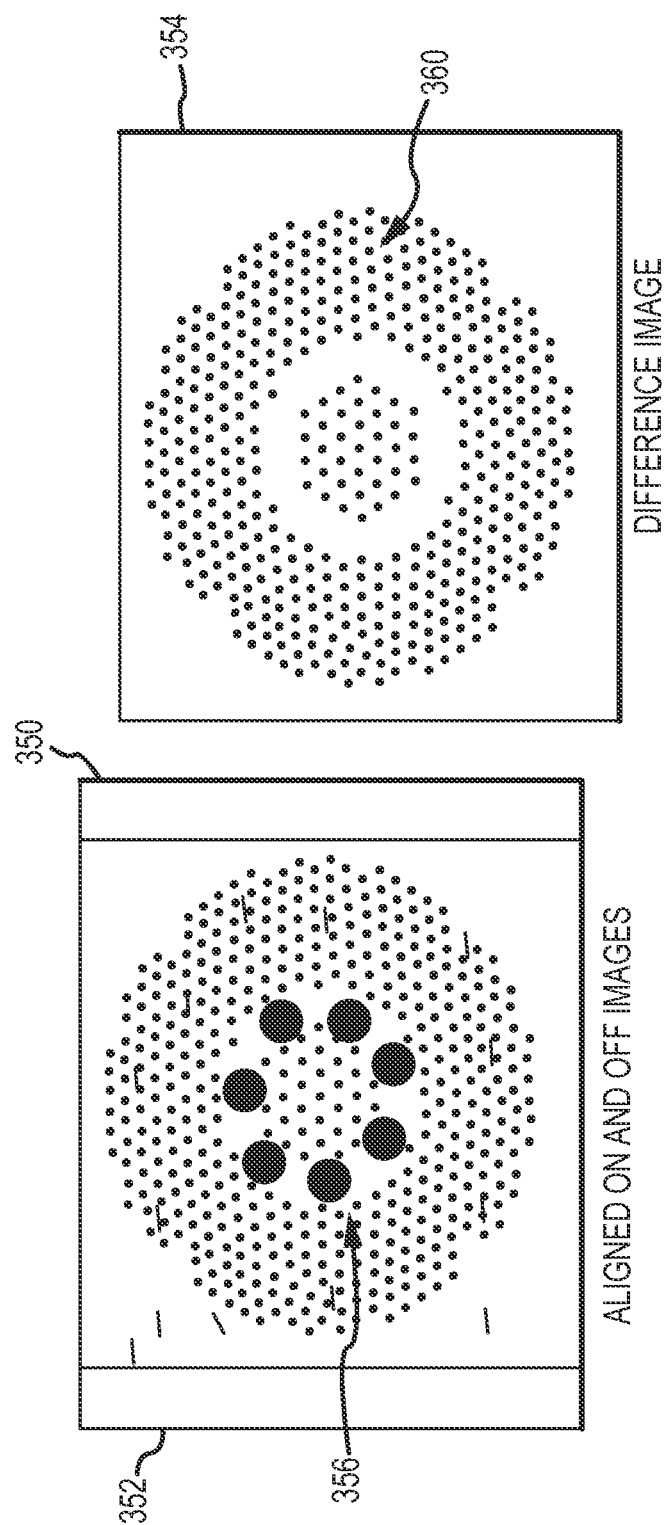

SYSTEM AND MOVING MODULATED TARGET WITH UNMODULATED POSITION REFERENCES FOR CHARACTERIZATION OF IMAGING SENSORS

GOVERNMENT RIGHTS

This invention was made with United States Government support under Contract Number HQ0276-10-C-0005 with the Missile Defense Agency. The United States Government has certain rights in this invention.

RELATED APPLICATION

This patent application is related to U.S. patent application entitled "BLUR-CALIBRATION SYSTEM FOR ELECTRO-OPTICAL SENSORS AND METHOD USING A MOVING MULTI-TARGET CONSTELLATION", Ser. No. 13/214,683 filed Aug. 22, 2011, the entire contents of which is incorporated by reference.

TECHNICAL FIELD

Some embodiments pertain to imaging systems. Some embodiments pertain to characterization of imaging sensors including electro-optical sensors. Some embodiments pertain to alignment of modulated images, particularly modulated composite images and/or modulated on and off images. Some embodiments pertain to measurement or calibration of imaging sensors. Some embodiments pertain to space-astronomy systems. Some embodiments pertain to kill vehicles and space systems.

BACKGROUND

One problem with imaging systems is the amount of image blur that is attributable to their optics and other components. Some applications require precision measurement of the system point-spread function (PSF) of the imaging system to be made in-situ. This is extraordinarily difficult as it may require measuring an unresolved (near point) source at a resolution that is far higher than the pixel resolution the imaging sensor. In some cases, it may also be necessary to measure the change in the PSF across the field-of-view (FOV) of an imaging sensor, compounding the blur-calibration problem.

This blur-calibration problem is markedly more difficult in systems where the required precision or other conditions, such as operation in cryo-vacuum conditions, make it impractical to project precision collimated patterns that fill the sensor's entire FOV. Conventional approaches used to blur-calibrate electro-optic sensors in a cryo-vacuum chamber are time-consuming, expensive and limited in accuracy.

Generally speaking, characterization e.g., measurement or calibration of electro-optic sensors and imaging systems can be time-consuming, expensive and limited in accuracy. Thus there are general needs for systems and methods for improved characterization of imaging sensors which reduce the cost and the characterization time and which increase the accuracy of the characterization data. What are also needed are systems and methods for characterization of imaging sensors suitable for use in cryo-vacuum conditions.

SUMMARY

Embodiments of a characterization system for electro-optical imaging sensors using a moving target are generally described herein. In some embodiments, characterization of an imaging sensor includes moving a known target pattern across the FOV of the imaging sensor to present the target pattern across different frames at different positions and capturing frames of images of the moving target pattern as seen in the FOV of the imaging sensor to generate image data outputs. The target pattern formed in and on a slide comprises at least one through-hole (resolved or unresolved) and at least one resolved patch. The patch and slide materials have different emission intensities in a detection band of the imaging sensor. A modulation is applied to modulate the emission intensities of only the through-holes; the resolved patches providing a position reference contrasted with the slide background that is independent of modulation. The positions of the resolved patches are measured and used to align the modulated images. The aligned image data outputs may be subsequently processed to generate data products representative of the response of the imaging sensor. One such data product used in blur-calibration is the shape of a point-spread function (PSF).

In some embodiments, the modulation is applied to the moving target sequence and separate modulated "on" and modulated "off" images are created. The PSF may be determined based on the difference between the modulated "on" and "off" images. The PSF may specify the shape of blur at one or more locations in the FOV. In some embodiments, a chopper may apply a chopper-modulation to produce chopper-open and chopper-closed images. In other embodiments, a sinewave modulator may apply a sinewave modulation.

In some embodiments, a high-resolution composite image may be generated from the frames. An overall shift of the target pattern across the FOV in each frame of video is determined. Objects observed in each frame of video of the image data output are associated with corresponding through-holes of the known target pattern. Sub-pixel resolution composition images are generated for the objects by combining different images of the same objects taken at different positions. Each sub-pixel resolution composite image being effectively placed within a high-resolution composite image according to a relative position, including full-pixel shift and sub-pixel phase, of the object in that image.

In different embodiments, a resolved patch has a circumference that overlaps at least five pixels in the imaging sensor. A plurality of resolved patches may have a total circumference that overlaps at least one hundred pixels in the imaging sensor.

In some embodiments, the resolved patch may have a diffuse surface.

In some embodiments, the resolved patch may be formed of a material having emission intensities that produce a negative contrast at the imaging sensor with respect to the background emission intensity of the slide material. In these embodiments, the imaging sensor may be cryo-cooled.

In some embodiments, the resolved patch may be formed of a material having emission intensities that produce a minimum contrast of at least 10 dB at the imaging sensor with respect to the background emission intensity of the slide material.

In some embodiments, the resolved patch material may comprise a surface coating on the slide that changes the emission intensity of the slide material. For example, a surface coating may comprise a micro-texture.

In some embodiments, the emission intensity, hence contrast of the resolved patches with the background slide is approximately uniform across the slide. In some embodiments, the emission intensity, hence contrast of the resolved patches with the background slide varies across the slide.

In some embodiments, the slide may comprise different resolved patches that produce positive and negative contrast with respect to the slide background.

In some embodiments, the slide may comprise a plurality of resolved patches arranged in a circle with uniform angular spacing about a target center. The plurality of resolved patches may be a prime number.

BRIEF DESCRIPTION OF THE DRAWINGS

FIGS. 5a through 5d illustrate a chopper-open (modulated on) image, chopper-closed (modulated off) image, aligned images and a difference image.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
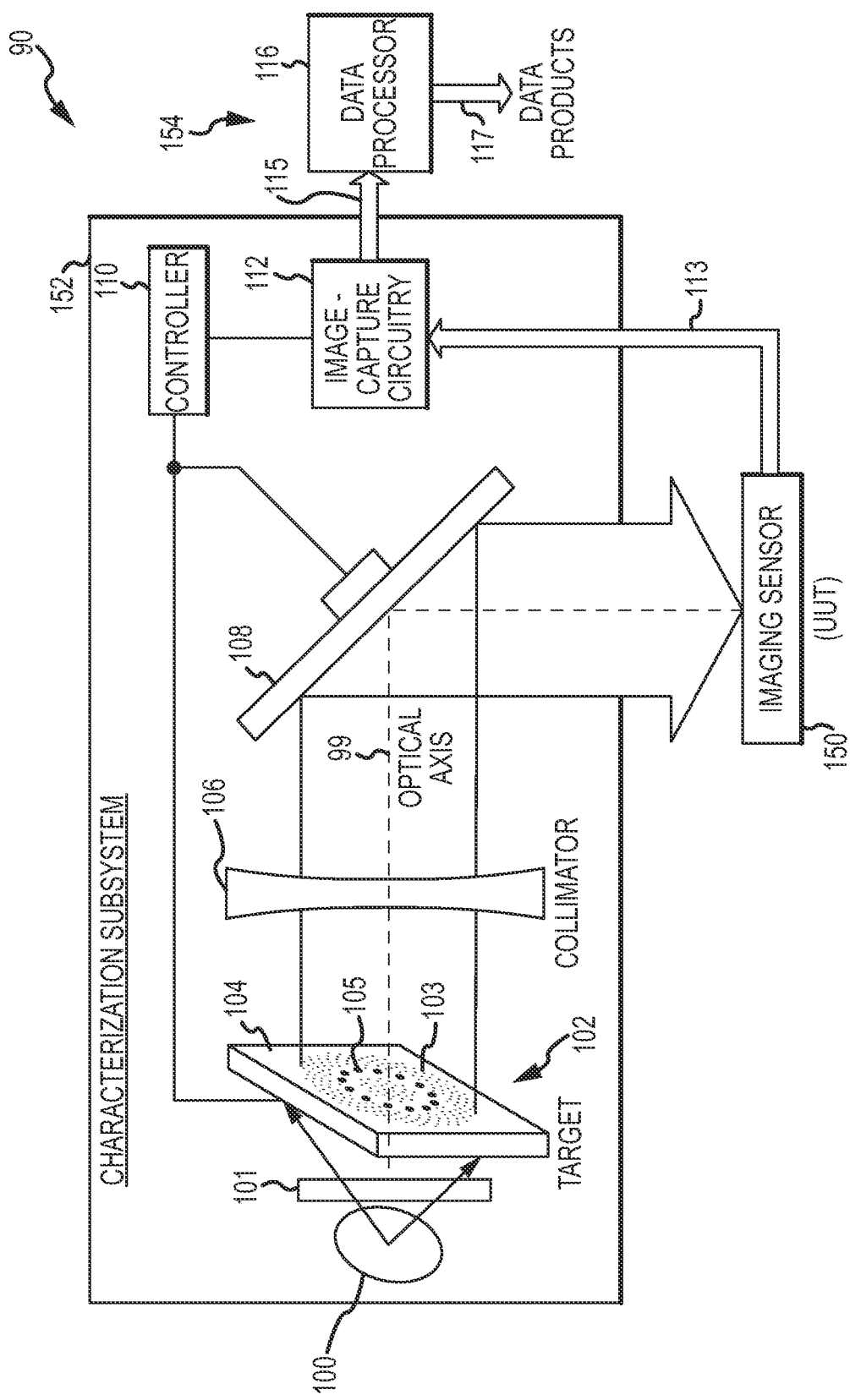
FIG. 1 illustrates a system for characterization of an imaging sensor in accordance with some embodiments.

FIG. 1 illustrates a system for characterization of an imaging sensor in accordance with some embodiments. System 90 may be configured for performing optical measurement or calibration for an electro-optical sensor, such as imaging sensor 150. Imaging sensor 150 comprises both the sensor and the optics assembly that focuses collimated light onto the sensor. The system 90 may include a characterization subsystem 152 to capture image data from the imaging sensor 150 and a data processing subsystem 154 to process the image data output 115 from the characterization subsystem 152 to generate characterization data for the imaging sensor 150 (i.e., the unit under test (UUT)). During assembly of the UUT, the sensor is nominally positioned at the focal plane of the optics assembly. Characterization data may, for example, include the following calibration and measurement data: systems point spread function (PSF), variations in the PSF across the imager FOV, identifications of unresponsive pixels, identification and characterization of pixels with non-linear response due to current leakage to or from adjacent pixels, optical distortion, gain map adjustments for unresolved sources, etc.

The blur-calibration subsystem 152 includes at least a light source 100 of electromagnetic (EM) radiation to which imaging sensor 150 is responsive (e.g. visible 0.4-0.7 um, NIR 0.7-1.1 um, SWIR 1.1-2.5 um, MWIR 3-5 um or LWIR 8-14 um), a modulator 101, a target 102, a projection element 106, a controller 110, and image-capture elements 112. Light source 100 may be a blackbody source or a coherent source.

The target 102 comprises a slide formed of a first material. Target 102 may have a known target pattern 104 comprising at least one through-hole 103 in the slide and at least one resolved patch 105 of a second material on the slide facing the imaging sensor. Through-holes may be unresolved point-like objects or resolved objects. The through-holes and resolved patches have fixed relative positions that are known. The patch material is selected to have different emission intensity than the slide material in the detection band of the imaging sensor so that the resolved patches provide position references against the slide background. These position references are not affected by the modulation of the illumination and the modulation of the through-hole spots. These position references provide a constant and sufficient contrast to the background emission intensity of the slide itself.

Modulator 101 may be configured to apply a modulation to the illumination to modulate the emission intensities of only the at least one through-hole 103. The modulation has substantially no effect on the emission intensity of the resolved patches 105 (stray light may have a minimal effect). Modulator 101 may modulate the emission intensities between modulated "on" and modulated "off" states. The modulation may be used to suppress the background of the slide (i.e., portion of the target without the through-holes). The use of modulation may be needed because the background is never perfectly zero or flat. In some embodiments, the controller 110 may control the application of a modulation at the target 102. Modulator 101 may, for example, comprise a sinewave modulator that imparts a sinewave modulation on the source illumination or a chopper that imparts a chopper modulation on the source illumination.

The projection element 106 may be configured to project at least a portion of the target pattern 104 within the FOV of the imaging sensor 150. The controller 110 may be configured to move the target pattern 104 across the FOV. The image-capture elements 112 may be configured to capture frames of images 113 of the moving target pattern 104 (i.e., frames of video) as seen in the FOV of the imaging sensor 150 and generate an image data output 115. The controller 110 may be configured to cause the target pattern 104 to move across the FOV to present the target pattern 104 across different frames on different pixels and at different positions.

The image data output 115 from the image-capture elements 112 may be subsequently processed by a data processing element 116 to measure the position of at least one resolved patch 105 in different frames and to use the measured position to align the image data outputs 115. The position references associated with each resolved patch may be measured by identifying spots contrasted to the background in image data outputs from the pixelated imaging sensor and calculating a centroid for each identified spot. Image data outputs 115 may be aligned by determining the x,y translation, and possibly rotation, that minimizes an error function such as least squares error method. Other higher order techniques may be used to identify the position references and align the image data outputs.

The critical aspect of the target is that the one or more resolved patches 105 provide position references that are independent of the modulation of the through-holes 103. Specifically, the apparent position of the position references created by resolved patches 105 does not change with modulation. The detected contrast of the position references to the background intensity and the detected shift of the position references given a shift of the target are fairly constant from frame-to-frame and across the slide. This is useful to align images, and particularly sub-pixel resolution images, to characterize the imaging sensor in a moving background environment.

Data processing element 116 may process the aligned image data outputs 115 to generate data products 117 representative of the response of the image sensor 150. These data products 117 may include, but are not limited to, systems point spread function (PSF), variations in the PSF across the imager FOV, identifications of unresponsive pixels, identification and characterization of pixels with non-linear response due to current leakage to or from adjacent pixels, optical distortion, gain map adjustments for unresolved sources, etc.

In the case of blur-calibration, data processing element 116 identifies modulated "on" and "off" image data outputs 115 and forms one or more difference images from those aligned image data outputs 115. Data processing element 116 processes the one or more difference images to generate data products 117 representative of a shape of a point-spread function (PSF).

The data processing element 116 may be a data processing system or a computer system configured to process the image data output 115 from the image-capture elements 112 as described in more detail below. In some embodiments, the data processing element 116 may be configured with software to process the image data output 115 generated from the image-capture elements 112.

In some embodiments, the image-capture elements 112 may comprise digital circuitry (CCDs) configured for image capture and image storage. In other the image-capture elements 112 may comprise an analog media such as film or magnetic media suitable for image capture and image storage.

The system 90 allows for characterization of the imaging sensor 150 while the target 102 is in motion across the FOV thus providing a more efficient and accurate characterization process. In accordance with some embodiments, the system 90 may be configured for performing optical characterization for an imaging sensor 150 in a chamber, such as a cryo-vacuum chamber.

In some embodiments, the data processing element 116 may be configured to determine an overall shift of the target pattern 104 across the FOV in each frame of video of the image data output 115. The point-like objects observed in each frame of video of the image data output 115 may be associated with corresponding unresolved through-holes 103 of the target pattern 104 (since the target pattern 104 is a known target pattern). One or more sub-pixel resolution composite images may be generated for one or more of the unresolved through-holes 103 by combining different images of same point-like objects taken at the different pixel phases. Each sub-pixel resolution composite image may be effectively placed within the high-resolution composite image according to its relative position, including its sub-pixel phase, of the unresolved through-holes 103 in that image. In these embodiments, the data processing element 116 may be configured to process the aligned high-resolution composition images to produce data products 117 representative of the response of the imaging sensor. In some embodiments, the data processing element 116 may be configured to create and align modulated "on" and modulated "off" high-resolution composition images to produce data products. The data processing element 116 may be configured to subtract the high-resolution modulated on and off composition images to create a high-resolution difference image.

For blur-calibration, a high-resolution difference image is formed from the aligned modulated "on" and "off" high-resolution composite images to produce data products 117 of a shape of the PSF from the composite image. The shape of the PSF represents the blur. The data products 117 that are produced are blur-calibration data for end-item use of the imaging sensor 150. The blur-calibration data may eliminate blur at one or more places in the FOV.

In some embodiments, the images of same point-like objects are applied to (i.e., placed within) the composite image at the relative position of the object in that image (i.e., relative to the other images) to generate the composite images. In some embodiments, the system 90 may also be configured to utilize a neighborhood of samples to provide error reduction in the high-resolution composite image to create an approximation of a PSF for each point-like object. The use of the neighborhood of samples provides for noise reduction in the high-resolution composite image, as well as error reduction (i.e., slope times the registration error) in the composite image.

In some embodiments, multiple images of different point-like objects of the same or different sizes may be included. In these embodiments, the relative offset of the objects may be known or may be calculated as a fit parameter. In these embodiments, each multiple image of each point-like object may be recorded.

The different pixel phases are different sub-pixel fractional positions of the point-like objects within each frame. The use of different sub-pixel fractional positions allows light to hit the pixels at different phases when scanned across the array. The combining of results from different pixels and source spots provides for high-collective phase diversity, effectively increasing the spatial sampling of the image sequence to far beyond the cameras native pixel-spacing resolution. In these embodiments, gains and offsets may be calculated as the target pattern 104 is scanned across different frames so that different pixels observe the same area of the target pattern 104.

In some embodiments, the characterization system 152 may also include one or more mirrors, such as mirror 108. In these embodiments, the controller 110 may be configured to move the target pattern 104 across the FOV by controlling and tilting one or more of the mirrors. In some embodiments, the controller 110 may be configured to move the target pattern 104 across the FOV by controlling movement of the imaging sensor 150, rather than by controlling mirrors. In other embodiments, the target 102 itself may be controlled to cause the target pattern 104 across the FOV.

In some embodiments, the projection element 106 may comprise a collimator to collimate light rays to project at least a portion the target pattern 104 within the FOV of the imaging sensor 150. In these embodiments, the collimated light rays make it appear as if the target 102 is at or near infinity. In general, only a portion of the target pattern 104 may be projected with the FOV of the imaging sensor 150, as there is no requirement that the entire target pattern 104 stay within the FOV.

In some embodiments, the data products 117 that are produced by data processing element 116 may be blur-calibration data for end-item use of the imaging sensor 150. The blur-calibration data may specify the shape of the blur at one or more places in the FOV. In some cases the effects of the size of the initial pinhole, relative to an idea point source, may be removed from the measures surface via de-convolution, often accomplished via a parametric fit to the remaining parameters. In some embodiments, the blur-calibration data may specify the shape of the blur at every location in the FOV. In general, the blur-calibration data may be manipulated to describe the PSF at some pre-determined location vs. where the actual point was sampled in test. In cases where the PSF is substantially constant across the FOV, this may not be necessary. In these embodiments, the blur-calibration data may be generated from a single data set (i.e., the image data output 115).

Figure 2:
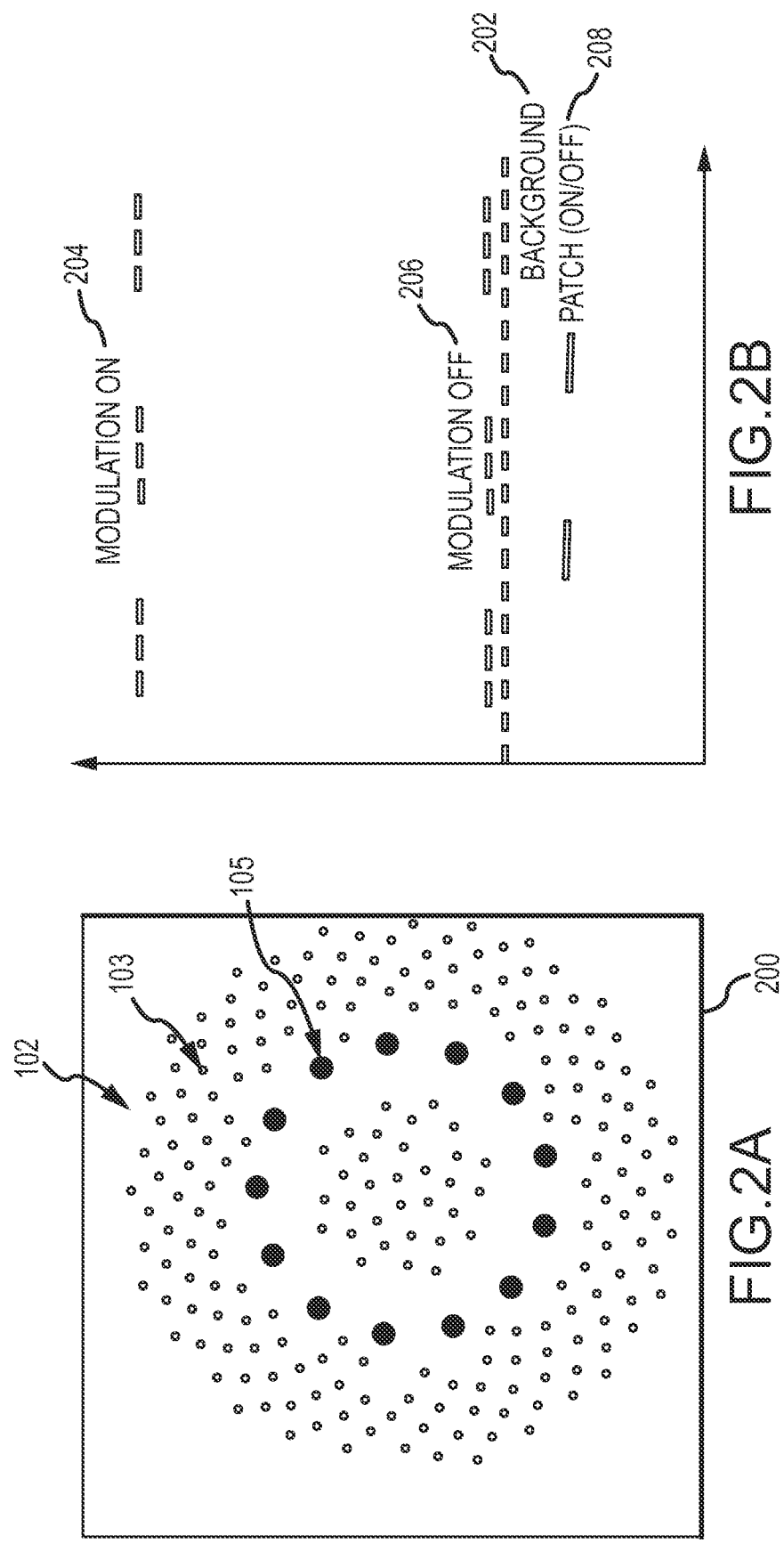
FIGS. 2a and 2b are a depiction of a target having modulated through-holes and unmodulated position references for use in characterization of an imaging sensor in accordance with some embodiments and a plot of emission intensities of the background slide, modulated "on" and "off" through-holes and unmodulated position references.

FIG. 2a is a target for use in characterization of an imaging sensor in accordance with some embodiments. Target 102 may correspond to target 102 (FIG. 1) and may have a known target pattern 104 that may comprise a plurality of through-holes 103 (resolved or unresolved) and a plurality of resolved patches 105 with fixed relative positions. Target 102 may be comprised of a slide 200 formed from a first material such as nickel, brass or titanium. The emission intensity of the slide material produces a constant background intensity level 202 in the detection band of the imaging sensor. Through-holes 103 produce an emission intensity that varies with the modulation. For example, a modulation "on" produces a bright spot with a high emission intensity level 204 whereas a modulation "off" produces a spot with a low emission intensity level 206 only slightly above background level 202. The patch material is selected to produce an emission intensity 208, constant over all modulations, which provides significant contrast with the background intensity level 202. As shown here, the resolved patch 105 produces a negative contrast. Other implementations may use patch materials that produce a positive contrast or both positive and negative contrasts. Different materials such as gold (diffuse) or different paints may be used to form patches 105.

In some embodiments, the target pattern 104 may be an asymmetric pattern configured to allow an overall position to be determined from a sufficiently large sub-area of the pattern 104. In these embodiments, the target pattern 104 may comprise a plurality of unique sub-patterns. In some embodiments, the through-holes 103 of the target pattern 104 may comprise irregularly spaced points having a wider spacing near a center of the pattern 104 and a closer spacing further away from the center for increased phase diversity and coverage, although this is not a requirement. In some embodiments, the target pattern 104 may comprise hexagonal rings of the through-holes 103. In some of these embodiments, the radius to each point may decrease linearly with the distance from the center. The use of hexagonal rings of the through-holes 103 may help in associating the point-like objects observed in each frame with corresponding through-holes of the known target pattern 104.

In some embodiments, the resolved patch 105 may have a diffuse (non-specular) surface.

In some embodiments, the resolved patch 105 may be formed of a material having emission intensities that produce a negative contrast at the imaging sensor with respect to the background emission intensity of the slide material. Diffuse gold is one such example. When used in combination with a "cold" imaging sensor, a resolved patch that produces a negative contrast will appear even colder due to "Narcissus". The negative contrast is induced by limited Narcissus where some of the light paths into the imaging sensor reflect back into the sensor itself seeing the cooled detector rather than the warmer chamber.

In some embodiments, the resolved patch may be formed of a material having emission intensities that produce a minimum contrast of at least 10 dB at the imaging sensor with respect to the background emission intensity level 202 of the slide material.

In some embodiments, the slide may comprise different resolved patches that produce positive and negative contrast with respect to the slide background.

In some embodiments, the slide may comprise a plurality of resolved patches arranged in a circle with uniform angular spacing about a target center. In some embodiments, the number of resolved patches may be a prime number.

Figure 3:
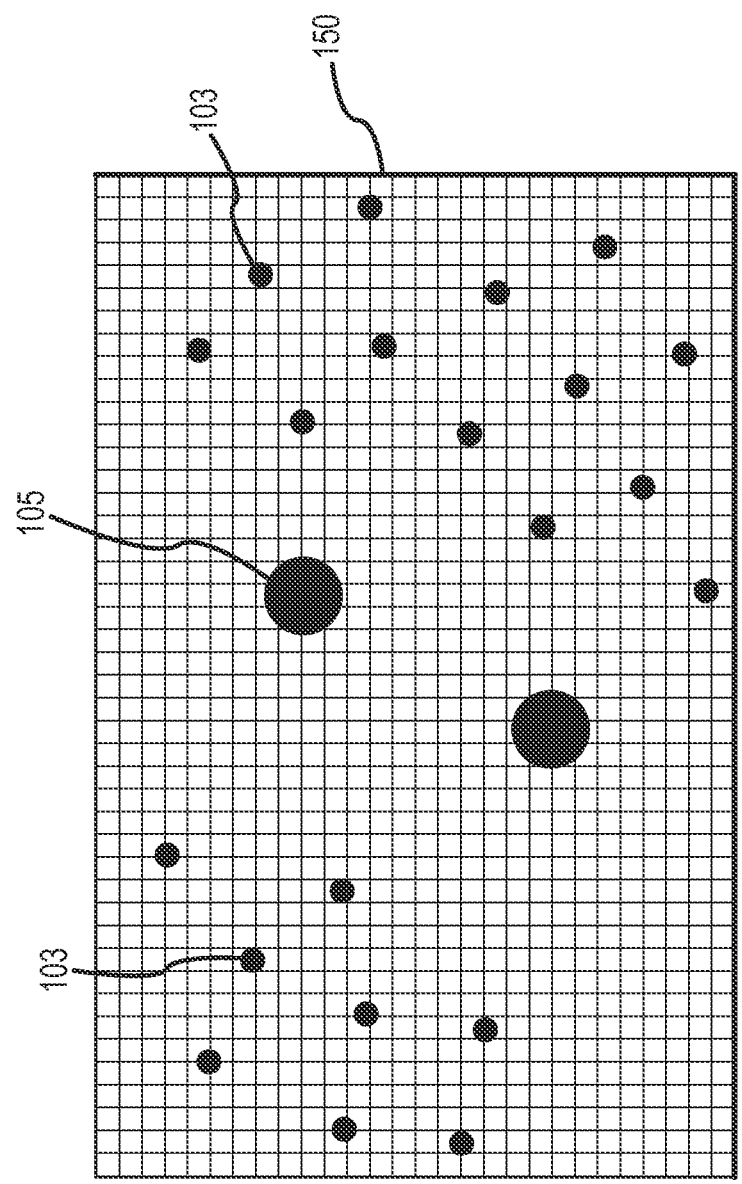
FIG. 3 is an illustration of an unresolved through-hole and a resolved position reference projected onto a pixelated image sensor.

FIG. 3 illustrates an unresolved through-hole 103 and a resolved patch 105 projected onto the pixelated imaging sensor 150. In radiometry, the distinction between "resolved" and "unresolved" objects is that the apparent intensity of an unresolved (point) object increases with $1/r^2$ as you approach the object where r is distance to the object. For a resolved (extended) object this is not the case. As you approach the object each point on the object emits as a point object but the object area increases such that the two effects tend to cancel. To a zero order approximation, an unresolved object is less than one pixel on the imaging sensor and a resolved object is greater than a pixel on the imaging system. In over-sampled systems, the cut-off is typically a few pixels.

For purposes of the characterization system, an unresolved object should be large enough that diffraction effects in the projection system do not alter the measured PSF and otherwise as small as possible to get the maximum modulation transfer function (MTF) for the higher frequencies in the PSF. The resolved objects should be large enough that the position measurement of the resolved patch is nominally independent of the shape of the PSF. The larger the number of imaging sensor pixels that overlap the circumference of the resolved patch the greater the independence.

In some embodiments, each unresolved through-holes projects to an area of less than one pixel on the imaging sensor.

In some embodiments, a single resolved patch has a circumference that overlaps at least thirty pixels on the imaging sensor i.e. the perimeter of the patch touches or crosses at least thirty pixels. The interior pixels are not relevant.

In some embodiments, each of a plurality of resolved patches has a circumference that overlaps at least five pixels on the imaging sensor. All of the patches have a total circumference that suitably overlaps at least one hundred pixels on the imaging sensor.

Figure 4:
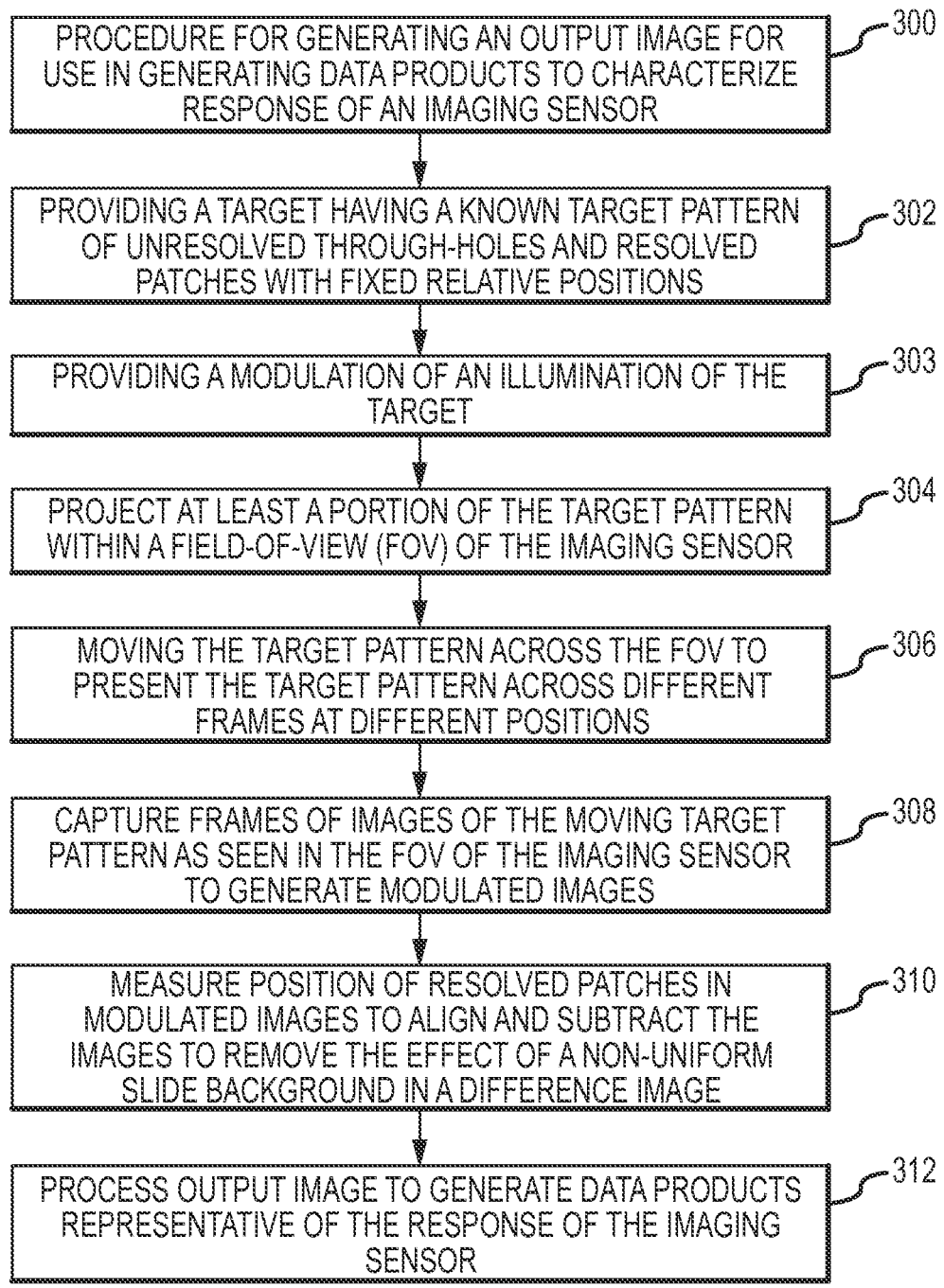
FIG. 4 is a procedure for generating image data output for use in characterization of an imaging sensor in accordance with some embodiments.

FIG. 4 is a procedure for generating image data output for use in characterization of an imaging sensor in accordance with some embodiments. Procedure 300 may be performed by characterization subsystem 152 (FIG. 1), although other subsystems may be configured to perform procedure 300. Procedure 300 may generate image output data for use in characterization of an imaging sensor, such as imaging sensor 150 (FIG. 1) for reducing and possibly eliminating blur at one or more locations in the FOV of the imaging sensor 150.

Operation 302 comprises providing a target having a known target pattern 104 comprising a plurality of unresolved through-holes 103 that project to a constellation of point-like objects and a plurality of resolved patches 105 with fixed relative positions. Resolved patches 105 having an emission intensity that contrasts with the emission intensity of the slide background within a detection band of the imaging sensor.

Operation 303 comprises providing illumination and then modulating the illumination, and specifically modulating the illumination of and through unresolved through-holes 103 to produce an "on" and "off" modulation of the illuminated through-holes 103.

Operation 304 comprises projecting at least a portion of the target pattern 104 within the FOV of the imaging sensor 150.

Operation 306 comprises moving the target pattern 104 across the FOV to present the target pattern 104 across different frames at different pixel phases.

Operation 308 comprises capturing frames of modulated images 113 of the moving target pattern 104 as seen in the FOV of the imaging sensor 150 and generating an image data output 115.

Operation 310 comprises measuring reference positions of resolved patches in the modulated images to align the modulated images. Blur-calibration, operation 310 further comprises subtracting the aligned modulated on and modulated off images to form a difference image to remove the effect of a non-uniform slide background in the difference image.

Operation 312 comprises processing the image data output to generate data products representative of the response of the imaging sensor. Blur-calibration operation 312 comprises processing the difference image, which may be a high-resolution composite difference image, to produce a shape of the PSF.

FIGS. 5a through 5d illustrate a procedure for aligning modulated on and modulated off images 350 and 352 and subtracting the aligned images to form a difference image 354. The modulated on and off images may represent the captured frames or may represent a sub-pixel resolution composite image. In both the modulated on and off states, the images include a non-uniform slide background 356 and a pattern of position references 358 that correspond to the pattern of resolved patches. The position references 358 may have a distinct and typically fairly uniform contrast with the slide background 356 regardless of modulation. In some embodiments, the emission intensities, hence resulting contrast of the patches, and thus position references 358 could vary across the slide. The contrast of a given patch and its position reference will remain fairly uniform from frame-to-frame. The measured positions of position references 358 do not change with modulation. The modulated on image 350 includes a constellation of point-like objects 360 corresponding to the pattern of unresolved through-holes in the slide. The position references 358 are used to align the modulated on and off images 350 and 352, which are subtracted to form difference image 354 that reduces or largely eliminates the non-uniform slide background 356 and the position references 358.

Figure 6:
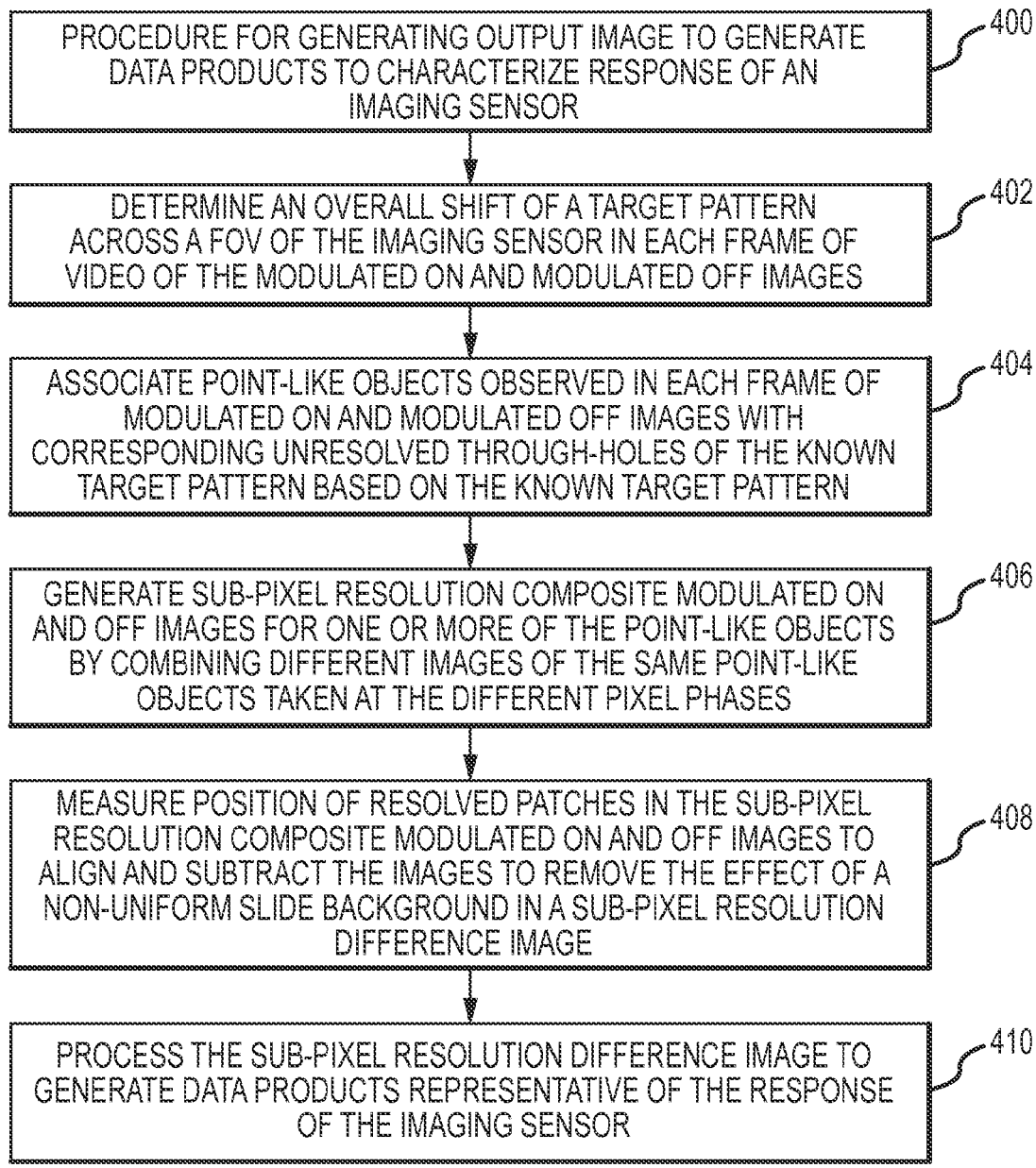
FIG. 6 is a procedure for processing image data output to generate characterization data from a high-resolution composite image for an imaging sensor in accordance with some embodiments.

FIG. 6 is a procedure for processing image data output to generate characterization data for an imaging sensor in accordance with some embodiments. Procedure 400 may be performed by data processing subsystem 154 (FIG. 1), although other subsystems may be configured to perform procedure 400.

Operation 402 comprises determining an overall shift of the target pattern 104 across the FOV in each frame of video of the image data output 115 for the modulated "on" and the modulated "off" images.

Operation 404 comprises associating the point-like objects observed in each frame of video of the image data output 115 (modulated "on" and "off" images) with corresponding unresolved through-holes 103 of the known target pattern 104 based on the known target pattern 104.

Operation 406 comprises generating modulated "on" and modulated "off" sub-pixel resolution composite images for one or more of the through-holes 103 by combining different images of same point-like objects taken at the different pixel phases.

Operation 408 comprises measuring reference positions of resolved patches in the sub-pixel resolution composite modulated images to align the modulated images. In blur-calibration, operation 408 further comprises subtracting the aligned modulated on and modulated off sub-pixel resolution composite images to form a composite difference image to remove the effect of a non-uniform slide background in the composite difference image.

Operation 410 comprises producing data products 117 representative of a response of image sensor from the aligned sub-pixel resolution composite images. Blur-calibration operation 410 comprises producing data products 117 representative of a shape of the PSF from the composite difference image.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory media for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 90 and particularly data processing element 116 (FIG. 1) may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for characterization of a pixelated imaging sensor, the system comprising:

a target comprising a slide formed of a first material, said target having a known target pattern comprising at least one through-hole in the slide and at least one resolved patch of a second material, said at least one through-hole and said at least one resolved patch having fixed relative positions, said first and second materials having different emission intensities in a detection band of the imaging sensor;

an illumination source configured to illuminate the target within the detection band;

a modulator configured to modulate the illumination emission intensities of only the at least one through-hole;

a projection element to project at least a portion of the target pattern within a field-of-view (FOV) of the imaging sensor;

a controller configured to move the target pattern across the FOV to present the target pattern across different frames at different positions;

image-capture elements to capture frames of images of the moving target pattern as seen in the FOV of the pixelated imaging sensor; and a data processing element configured to measure the position of at least one said resolved patch in the images and use the measured positions to align the images, and to process the aligned images to generate data products representative of the response of the pixelated imaging sensor.

2. The system of claim 1, wherein the data processing element is configured to:

determine an overall shift of the target pattern across the FOV in each frame of video of the image data output;

associate objects observed in each frame of video of the image data output with corresponding through-holes of the known target pattern based on the known target pattern;

generate one or more sub-pixel resolution composite images for one or more of the objects by combining different images of same objects taken at the different positions, each sub-pixel resolution composite image being effectively placed within a high-resolution composite image according to a relative position, including full-pixel shift and sub-pixel phase, of the object in that image; and produce data products representative of a shape of a point-spread function (PSF) from the high-resolution composite image from the captured frames.

3. The system of claim 2, wherein the through-holes are unresolved through-holes that produce point-like objects in each frame of video.

4. The system of claim 2, wherein the data processing element is further configured to:

generate composite images of the moving target pattern by separately generating modulated on and off composite images from the frames to allow removal of a non-uniform slide background, and align the high-resolution composite images of the modulated on and off frames and subtracting the aligned frames from each other to remove the effect of the slide background and capture the PSF.

5. The system of claim 4, wherein the modulator comprises a chopper that provides a chopper-modulation to provide chopper-open and chopper-closed composite images as the modulated on and off frames, respectively.

6. The system of claim 1, wherein the data processing element is further configured to:

generate images of the moving target pattern by separately generating modulated on and off composite images from the frames to allow removal of a non-uniform slide background, and align the images of the modulated on and off frames and subtracting the aligned frames from each other to remove the effect of the slide background and produce data products representative of a shape of a point-spread function (PSF).

7. The system of claim 1, wherein through-holes are unresolved through-holes that produce point-like objects in each frame of video and said at least one resolved patch has a circumference that overlaps at least five pixels in the imaging sensor.

8. The system of claim 1, wherein said at least one resolved patch has a circumference that overlaps at least five pixels in the imaging sensor.

9. The system of claim 8, wherein the slide comprises a plurality of resolved patches, a total circumference for said plurality overlapping at least one hundred pixels in the imaging sensor.

10. The system of claim 1, wherein said at least one resolved patch has a diffuse surface.

11. The system of claim 1, wherein said at least one resolved patch has an emission intensity that produces a negative contrast at the imaging sensor with respect to the emission intensity of the slide material.

12. The system of claim 11, wherein the second material comprises diffuse gold.

13. The system of claim 11, further comprising at least one resolve patch formed of a material having an emission intensity that produces a positive contrast at the imaging sensor with respect to the emission intensity of the slide material.

14. The system of claim 1, wherein said at least one resolved patch has an emission intensity that produces a contrast at the imaging sensor with respect to the emission intensity of the slide material of at least 10 dB.

15. The system of claim 1, wherein the slide comprises a plurality of resolved patches arranged in a circle with uniform angular spacing about a target center.

16. The system of claim 1, wherein said second material comprises a surface coating on the first material.

17. A system for characterization of a pixelated imaging sensor, the system comprising:

a target comprising a slide formed of a first material, said target having a known target pattern comprising at least one unresolved through-hole in the slide and at least one resolved patch of a second material, said at least one unresolved through-hole and said at least one resolved patch having fixed relative positions, said first and second materials having different emission intensities in a detection band of the imaging sensor;

an illumination source configured to illuminate the target within the detection band;

a modulator configured to modulate the illumination emission intensities of only the at least one unresolved through-hole;

a projection element to project at least a portion of the target pattern within a field-of-view (FOV) of the imaging sensor;

a controller configured to move the target pattern across the FOV to present the target pattern across different frames at different positions;

image-capture elements to capture frames of images of the moving target pattern as seen in the FOV of the pixelated imaging sensor; and a data processing element configured to determine an overall shift of the target pattern across the FOV in each frame of video of the image data output;

associate point-like objects observed in each frame of video of the image data output with corresponding unresolved through-holes of the known target pattern based on the known target pattern;

generate sub-pixel resolution composite images by separately generating high resolution modulated on and off composite images from the frames to allow removal of a non-uniform slide background, each said composite image generated for one or more of the objects by combining different images of same objects taken at the different positions, each sub-pixel resolution composite image being effectively placed within a high-resolution composite image according to a relative position, including full-pixel shift and sub-pixel phase, of the object in that image;

measure the position of at least one said resolved patch in the high-resolution composite images of the modulated on and off frames and use the measured positions to align those images;

subtract the aligned composite images from each other to remove the effect of the slide background in a high-resolution difference image; and produce data products representative of a shape of a point-spread function (PSF) from the high-resolution difference image.

18. A system for characterization of a pixelated imaging sensor, the system comprising:

a target comprising a slide formed of a first material, said target having a known target pattern comprising a plurality of through-holes in the slide and a plurality of resolved patches of a second material, said through-holes and said resolved patches having fixed relative positions, said first and second materials having different emission intensities in a detection band of the imaging sensor, each said resolved patch having a circumference that overlaps at least five pixels in the imaging sensor, said plurality of resolved patches having a total circumference that overlaps at least one hundred pixels in the imaging sensor, said resolved patches of said second material providing a contrast with respect to the emission intensity of the slide of at least 10 dB at the imaging sensor;

an illumination source configured to illuminate the target within the detection band;

a modulator configured to modulate the emission intensities of only the at least one unresolved through-hole;

a projection element to project at least a portion of the target pattern within a field-of-view (FOV) of the imaging sensor;

a controller configured to move the target pattern across the FOV to present the target pattern across different frames at different positions;

image-capture elements to capture frames of images of the moving target pattern as seen in the FOV of the pixelated imaging sensor; and a data processing element configured to measure the position of at least one said resolved patch in the images and use the measured positions to align the images, and to process the aligned images to generate data products representative of the response of the pixelated imaging sensor.

19. The system of claim 18, wherein through-holes are unresolved through-holes that produce point-like objects in each frame of video.

20. The system of claim 18, wherein at least some of said resolved patches have an emission intensity that produces a negative contrast at the imaging sensor with respect to the emission intensity of the slide material.

* * * * *